Sept. 3, 1957  T. O. SUMMERS, JR  2,804,776
GYROSCOPE INSTRUMENT WITH DUAL PURPOSE MOTORS
Filed April 28, 1953  7 Sheets-Sheet 1

THOMAS O. SUMMERS, JR.
INVENTOR.

BY R. E. Branque

ATTORNEY

Sept. 3, 1957 T. O. SUMMERS, JR 2,804,776
GYROSCOPE INSTRUMENT WITH DUAL PURPOSE MOTORS
Filed April 28, 1953 7 Sheets-Sheet 2

THOMAS O. SUMMERS, JR.
INVENTOR.

BY R. E. Granger

ATTORNEY

Sept. 3, 1957 T. O. SUMMERS, JR 2,804,776
GYROSCOPE INSTRUMENT WITH DUAL PURPOSE MOTORS
Filed April 28, 1953 7 Sheets-Sheet 4

THOMAS O. SUMMERS, JR.
INVENTOR.

BY R. E. Geangue
ATTORNEY

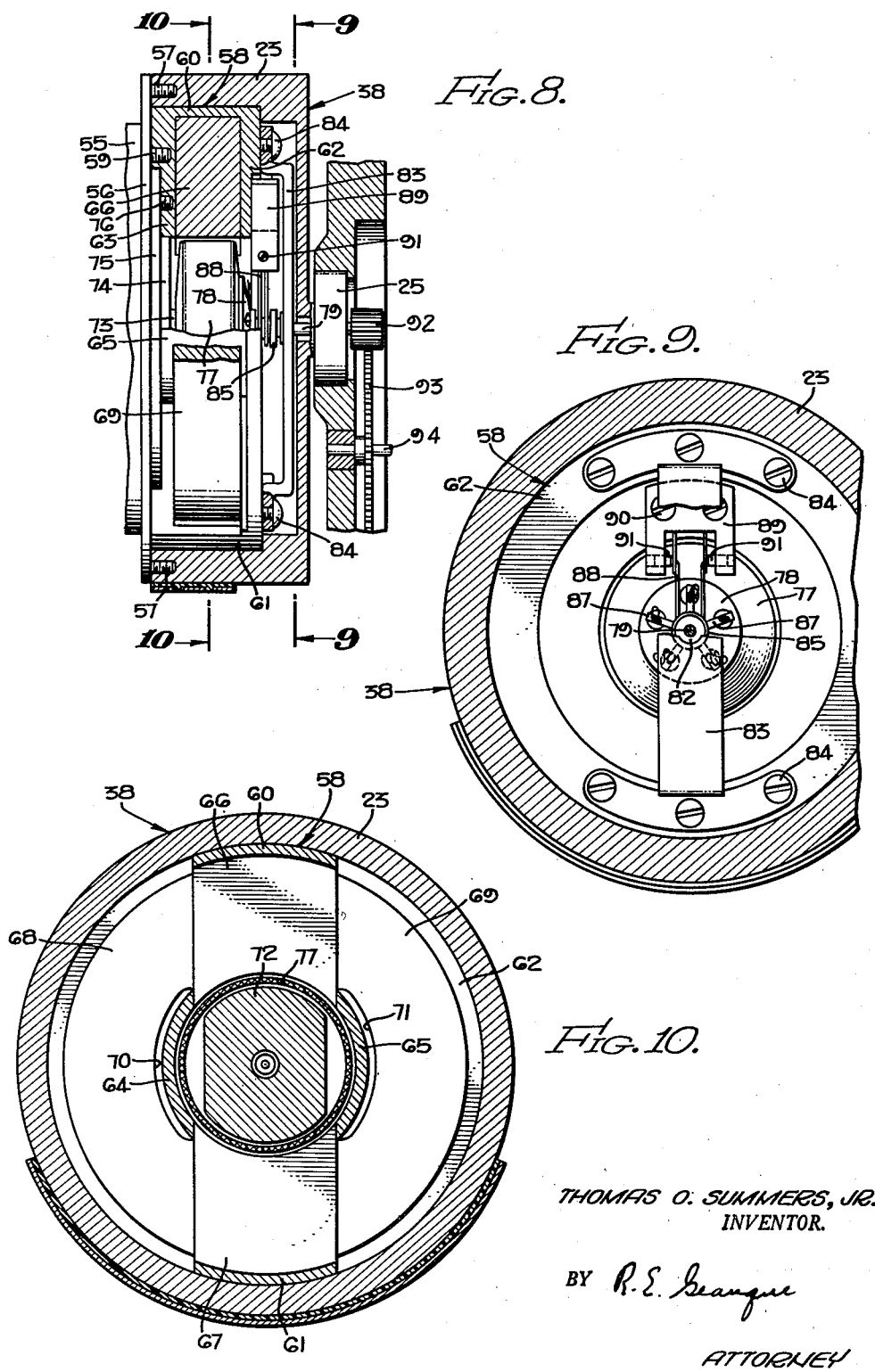

Sept. 3, 1957  T. O. SUMMERS, JR  2,804,776
GYROSCOPE INSTRUMENT WITH DUAL PURPOSE MOTORS
Filed April 28, 1953  7 Sheets-Sheet 6

THOMAS O. SUMMERS, JR.
INVENTOR.

BY R. E. Geaugue

ATTORNEY

THOMAS O. SUMMERS, JR.
INVENTOR.

BY R. E. Geangue
ATTORNEY

United States Patent Office

2,804,776
Patented Sept. 3, 1957

2,804,776

GYROSCOPE INSTRUMENT WITH DUAL PURPOSE MOTORS

Thomas O. Summers, Jr., Sherman Oaks, Calif.

Application April 28, 1953, Serial No. 351,571

17 Claims. (Cl. 74—5.6)

This invention relates to gyroscopes for use in land, air and water craft, and especially to a radio-controlled type of gyroscope wherein a single direct-current motor is utilized as both a trim motor and an erecting motor.

In remotely controlled aircraft employing a gyrovertical as a stable reference, or, in other words, as a means of establishing the vertical line in space, it is necessary to provide means for biasing this reference in order to accomplish maneuvers. Usually such gyroverticals employ trim or control motors energized via a radio link, with the result that the stable reference is biased as a function of the time of the radio signal. To this end, it is desirable to utilize a high torque-to-inertia ratio type of trim motor to minimize overshooting and to avoid hunting upon automatic centering of the trim motor.

This trim motor can also be utilized as a torquing motor since it is of the type wherein the armature windings of the motor are bonded together by a light, non-magnetic material. Such a motor is highly desirable for use as an erecting motor since it has no inherent residual magnetism to exert unwanted torques on the gyroscope and also has the inherent advantage that it possesses a high torque-to-inertia ratio because of the exceedingly small mass of the armature.

In conventional gyroscopic instruments, trim devices are essential and are expensive because it is necessary to employ two such motors to effect biasing of the trim references and another two motors to effect erection to the gyroscope. By the present invention, a novel device is proposed by which it is possible to utilize one such motor to serve the dual purposes of biasing the stabilized reference and torquing the gimbal, and both of these purposes are accomplished in a highly efficient manner.

It is therefore an object of the present invention to provide a single motor to exert precessing torques upon the gyroscope and also to bias one of the references of the gyroscope in order to accomplish maneuvers.

Another object of the invention is to provide a universally supported gyrovertical which has torquing motors about two of its axes and pickoffs about these same two axes which are biased by the same torquing motors.

A still further object of the invention is to provide a single direct-current motor about one axis of a gyroscope which can be utilized to torque the gyroscope and which can also be utilized to adjust the reference about this same axis when it is desired to maneuver the craft.

A still further object of the invention is to provide a direct-current torquing motor which has no inherent residual magnetism so as to cause undesirable torquing of the gyroscope, and which also has a high torque-to-inertia ratio, so as to avoid hunting and minimize overshooting when this same motor is used to adjust a reference of the gyroscope.

These and other objects of the invention not specifically enumerated above will become readily apparent to those skilled in the art in connection with the accompanying specifications and drawings in which:

Figure 8 is a vertical section along line 8—8 of Figure 4 illustrating the construction of one of the direct-current motors utilized in the present invention.

Figure 9 is a vertical sectional view along line 9—9 of Figure 8 illustrating the commutator for the motor.

Figure 10 is a sectional view along line 10—10 of Figure 8 illustrating the pole pieces and the magnets for the motor.

Figure 12 is a schematic diagram of the wiring utilized in the present invention.

Figures 1, 2:
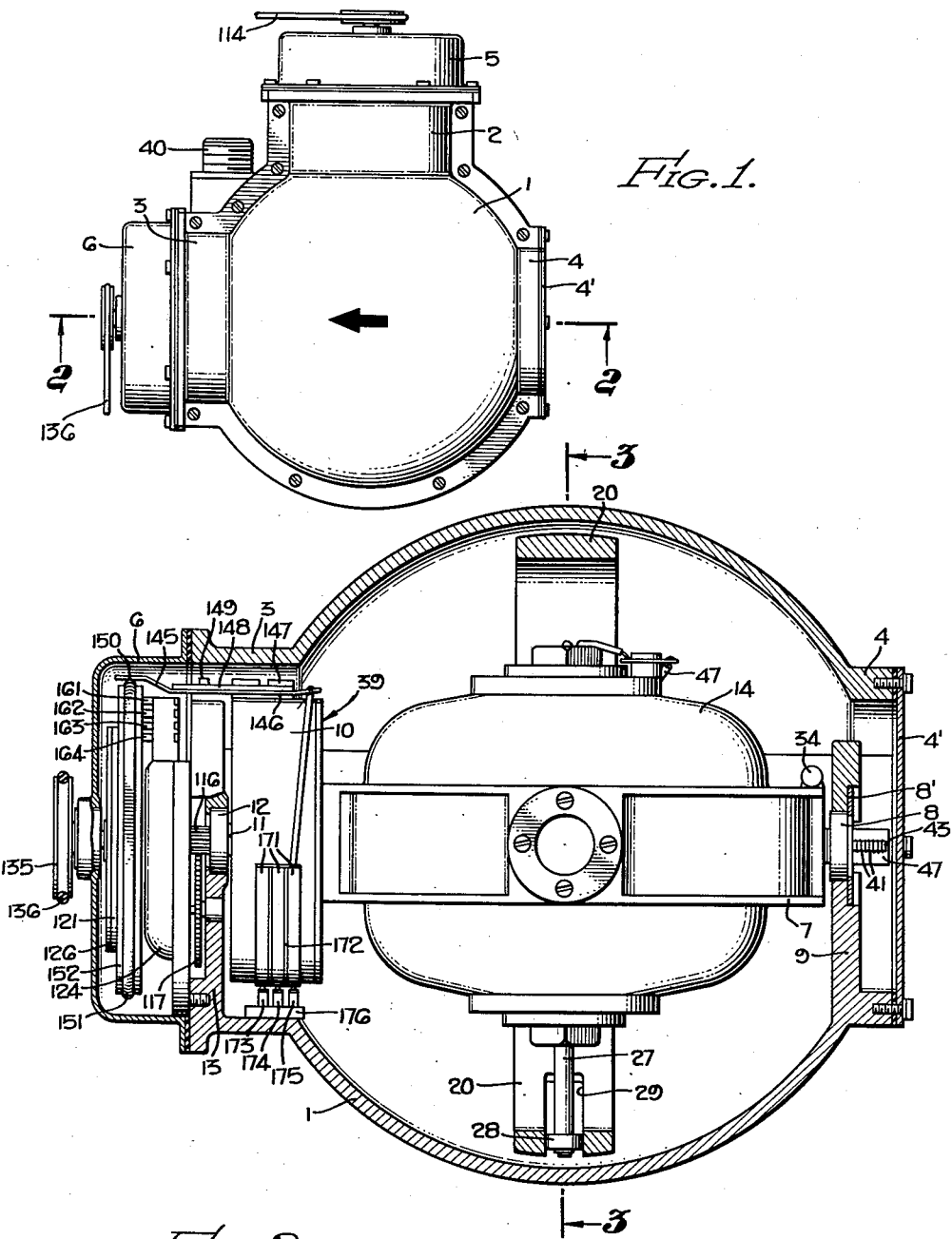
Figure 1 is a top plan view of the gyroscope instrument of this invention wherein the arrow indicates the direction of movement of the craft.
Figure 2 is a vertical sectional view along line 2—2 of Figure 1 with parts left in elevation illustrating the direct-current motor supported by the outer gimbal of the gyroscope.
Figure 3:
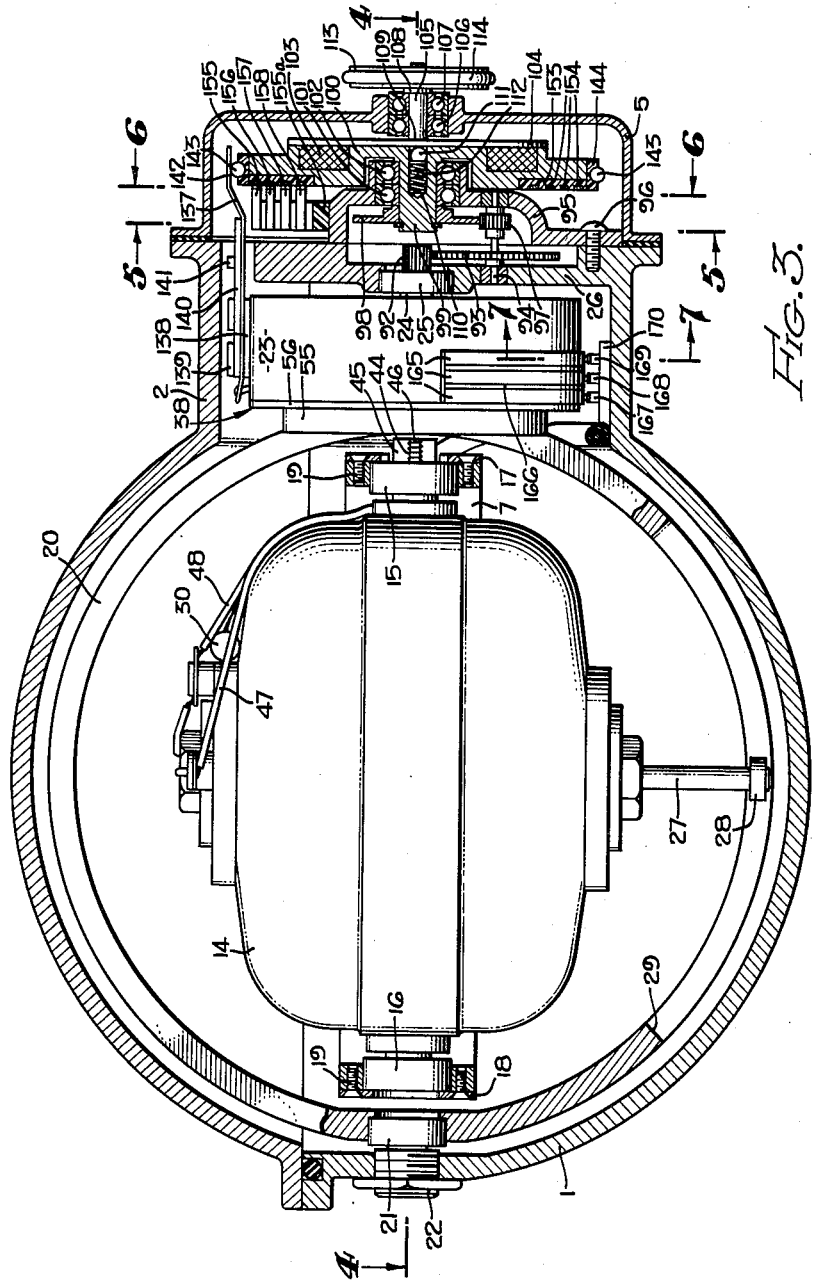
Figure 3 is a transverse vertical section along line 3—3 of Figure 2, with parts left in elevation, illustrating the direct-current motor supported by a neutrally balanced bail movable about the inner gimbal axis of the gyroscope.
Figure 4:
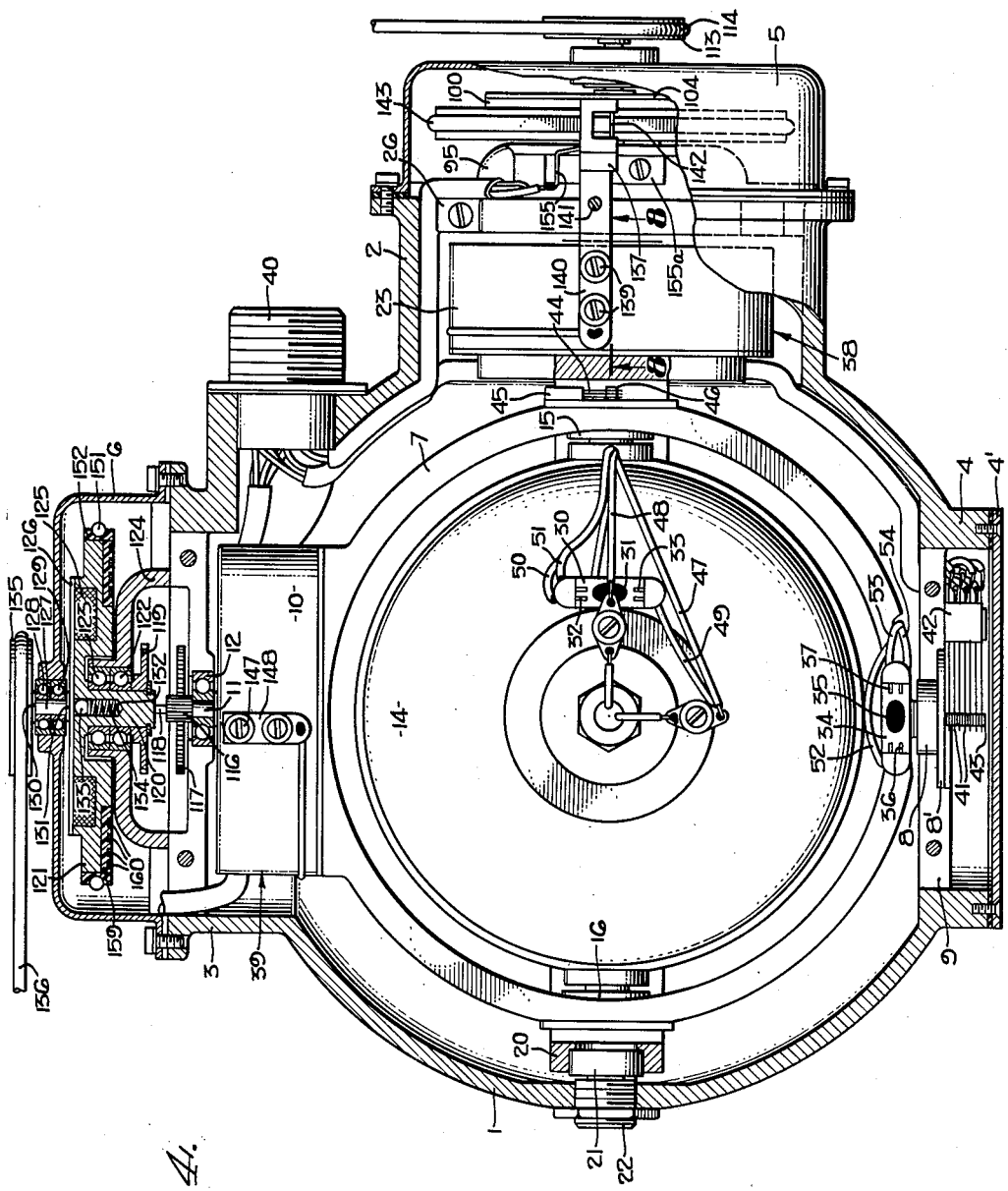
Figure 4 is a horizontal sectional view along line 4—4 of Figure 3, with parts left in elevation, illustrating the electrolytic gravity switches utilized to erect the gyroscope to the vertical line in space.
Figure 5:
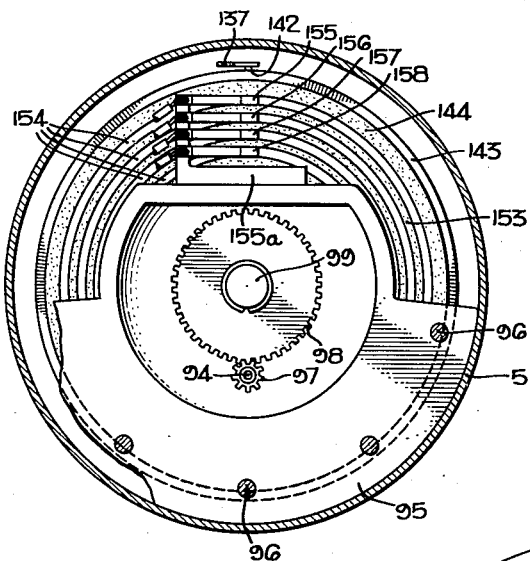
Figure 5 is a vertical sectional view along line 5—5 of Figure 3 illustrating the slip ring connections for one of the reference windings and its accompanying clutch.
Figure 6:
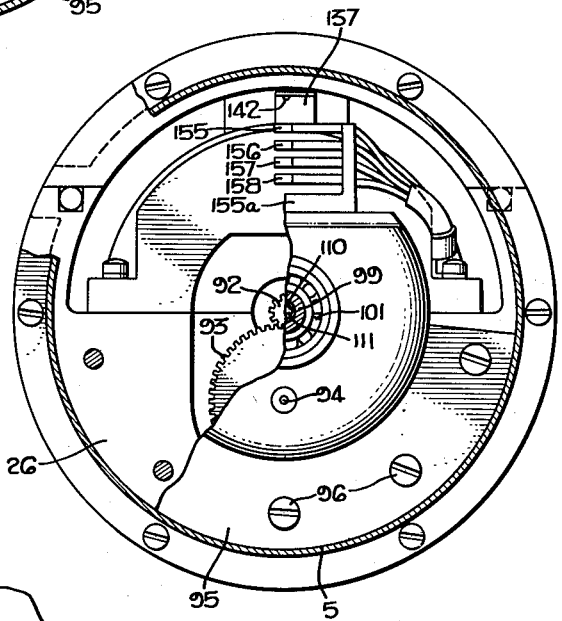
Figure 6 is a vertical sectional view along line 6—6 of Figure 3 illustrating the slip rings for one of the gyro references.
Figure 7:
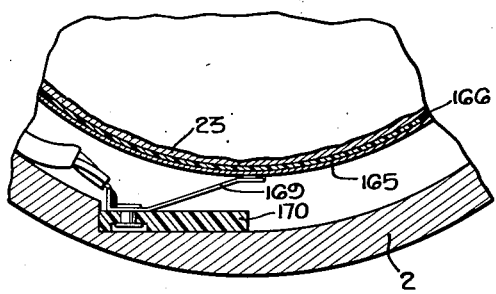
Figure 7 is a vertical sectional view along line 7—7 of Figure 3 illustrating the slip ring connections for the motor armature and reference pickoff.

The embodiment of the present invention chosen for illustration comprises a divided casing 1 having projections 2 and 3 for housing two of the motors of this invention and a projection 4 for housing slip ring connections for the gyroscope motor. The projections 2 and 3 have cup-shaped cover plates 5 and 6, respectively, for enclosing gyroscope references, and projection 4 has a cover plate 4'. The gyroscope has an outer gimbal 7 which is supported at one side by bearing 8 retained in the casing extension 9 by bearing retainer 8'. A motor casing 10 is secured to the other side of the outer gimbal in a manner later to be described and has a shaft projection 11 which is supported by bearing 12 in casing extension 13. It is therefore apparent that the outer gimbal is pivotally mounted by bearings 8 and 12 and that the motor casing 10 will move with the outer gimbal.

The gyroscope also has an inner gimbal 14 which houses the gyroscope motor and rotor and which is pivotally mounted in the outer gimbal 7 by bearings 15 and 16. These bearings have retainer rings 17 and 18, respectively, which are secured to the outer gimbal by screws 19, and the axis of the inner gimbal is positioned at right angles to the axis of the outer gimbal. A neutrally balanced bail 20 is pivotally mounted at one end about the inner gimbal axis by bearing 21 supported by plug 22 secured in the casing 1. The bail 20 carries, at its other side, the motor casing 23 which has a shaft extension 24 pivotally supported by bearing 25 retained in casing extension 26. The inner gimbal 14 has a pin 27 rigidly secured thereto which has a roller 28 at one end positioned within slot 29 of the bail 20. Because of this construction, the bail 20 and the motor casing 23 will move with the inner gimbal about the inner gimbal axis while the inner gimbal is free to move relative to the outer gimbal because of slot 29.

In order to continually erect the gyroscope to true vertical, a gravity switch 30 is mounted on the inner gimbal 14 so as to be sensitive to movements of the inner gimbal about its axis away from true vertical. This switch contains a globule 31 of any type of conducting fluid, such as mercury, and has two pairs of contacts 32 and 33 at its opposite sides so that one or the other of the pair of contacts can be closed by globule 31, depending upon the direction of movement of the inner gimbal away from true vertical. A second electrolytic gravity switch 34 is mounted on the outer gimbal 7 in position to be sensitive to movements of the gyroscope away from true vertical about the outer gimbal axis. This switch contains a globule 35 of any conducting fluid, such as mercury, and has pairs of contacts 36 and 37 mounted at its opposite sides so that the globule 35 can close one or the other of the pairs of contacts, depending upon which direction the gyroscope moves from true vertical about the outer gimbal axis. The switch 34 will energize the torquing motor 38 while the switch 30 will energize the torquing motor 39 so that the motor 39 will place a torque about the outer gimbal axis when the gyroscope moves away from true vertical about the inner gimbal axis, and the motor 38 will place a torque upon the inner gimbal axis through bail 20 when the gyro moves away from true vertical about the outer gimbal axis. These torques will cause the desired precession of the gyroscope to true vertical because of the well-known principle that a gyroscope will precess at right angles to the direction in which the torque is applied.

In order to supply electrical energy to the moving parts of the gyroscope instrument, a number of leads enter electrical plug 40 of casing 1 and six of these leads connect with thin wire wipers 41 which are mounted by bracket 42 and have one end bearing against slip rings carried by shaft extension 43 of the outer gimbal. These six leads pass through bearing 8 and are secured to the outer gimbal for movement therewith and four of the leads connect with double wire wipers 44, and these are carried by insulated bracket 45, and have one end bearing against slip rings on shaft extension 46 of the inner gimbal. These four leads then pass through bearing 15, and lead 47 supplies electrical energy to the gyro motor while lead 48 is the return lead for the motor. A branch lead 49 energizes switch 30, which has return leads 50 and 51. Another branch lead 52 supplies electrical energy to switch 34, and this switch has return leads 53 and 54. Because of this construction, it is possible to energize the gyro motor and the electrolytic gravity switches through the relatively moving parts of the gyroscope.

Figure 11:
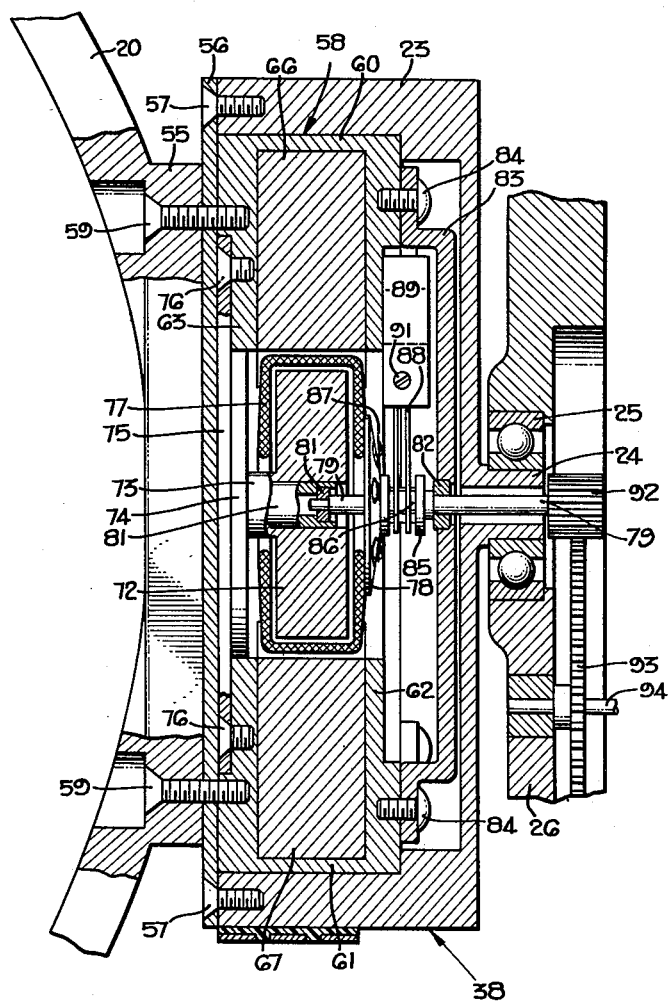
Figure 11 is an exploded sectional view similar to that of Figure 8 and illustrating the motor armature construction.
Figure 19:
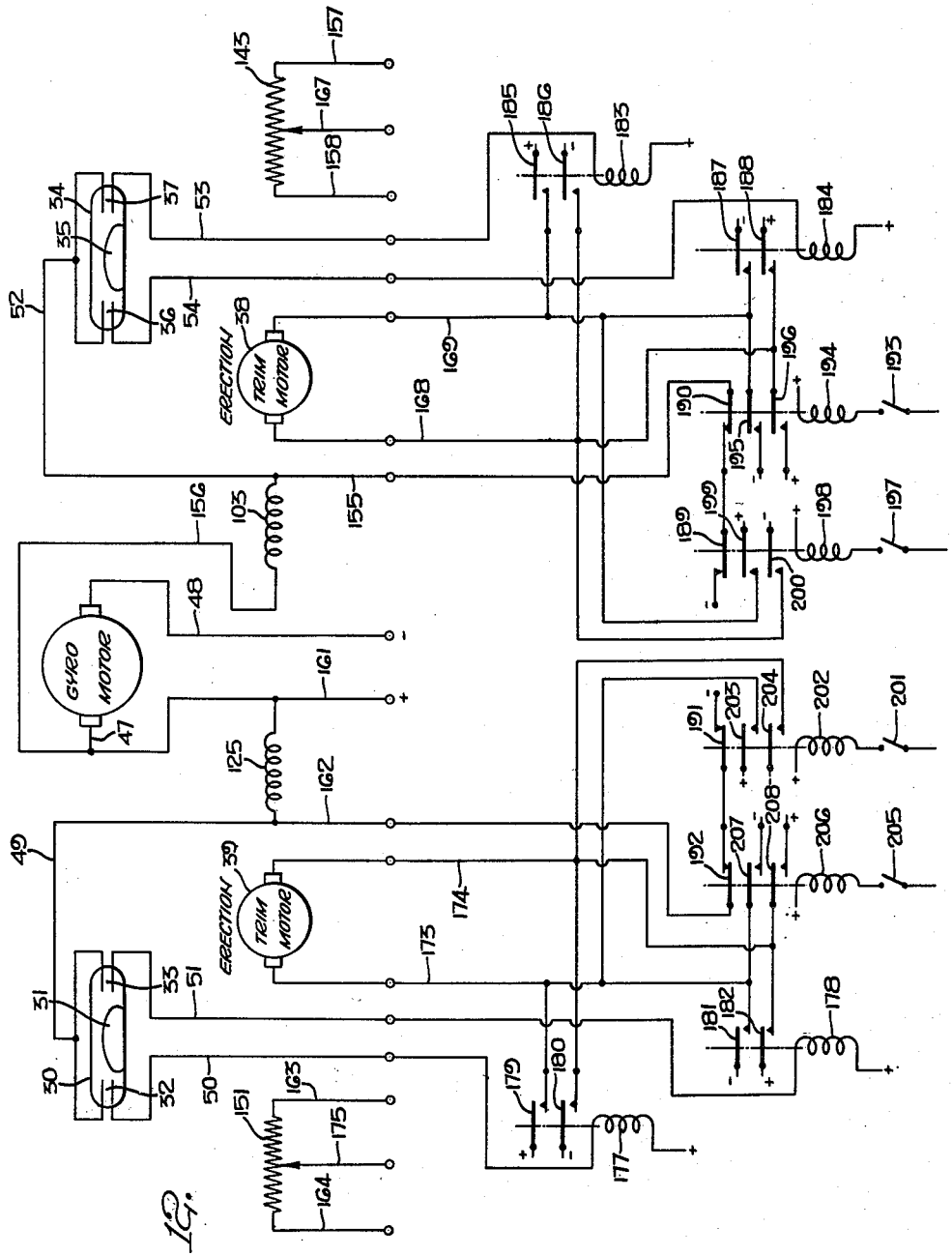

The manner in which the motor casing 23 is secured to bail 20 will now be described in connection with Figures 8 and 11, and it will be understood that the motor casing 10 of motor 39 is secured to the outer gimbal in the same manner. The bail 20 has a flat section 55 for mounting a cover plate 56 which is secured to motor casing 23 by screws 57, and a pole retaining member 58 is likewise secured to the bail 20 by means of screws 59 which pass through plate 56 and serve to retain this plate against section 55. The pole retaining member 58 has ends 60 and 61 and sides 62 and 63, and side 62 is circular in form in order to center the retaining member within casing 23. Each of these sides has an opening which divides each side and is large enough to receive the outer armature, and the sides are connected together by circular members 64 and 65. Two pole pieces 66 and 67 are tightly fitted between the sides 62 and 63, and circular magnets 68 and 69 have like poles bearing against each of these pole pieces so as to create a flux path. Circular magnets 68 and 69 have cutaway portions 70 and 71, respectively, to receive the members 64 and 65, and no further support is required for these magnets because of their attraction to the pole pieces. A soft iron core 72 is positioned between the pole pieces and has an extension 73 which mounts a first circular section 74 to position the core between the pole pieces and a second circular extension 75 which is secured to side 63 of member 58 by screws 76. By this construction, the casing 23, pole pieces 66 and 67, circular magnets 68 and 69 and core 72 will all be rigidly secured to bail 20 for movement therewith.

The armature 77 has two end openings smaller than the core 72 and is formed on the core in the manner described in United States Patent No. 2,763,052 granted September 18, 1956 to Edward M. Elmer. In order to form the armature, the core is first coated with a uniform coating of some material, such as aluminum, and the armature winding is then wound around this coating material. After the winding is completed, the coating material is removed to leave a uniform air space between the armature winding and the core and the winding is impregnated with any suitable non-magnetic type of material, such as plastic, in order to aid in making the winding self-supporting. In this manner, an armature is formed of wholly non-magnetic material and therefore has no inherent residual magnetism. Also, the armature has minimum weight so that it has a high torque-to-inertia ratio.

The armature 77 is attached to hub 78 in any suitable manner, and this hub is supported by armature shaft 79, which is supported at one end by bearing 80, retained by cylindrical member 81 within a central opening in the core. The other bearing 82 for shaft 79 is mounted in a bearing retainer plate 83, which is secured to side 62 by means of screws 84. Between these bearings, the shaft 79 mounts a commutator 85 having five commutator bars 86 which are connected by leads 87 to the coils of the armature. The double wipers 88 for the commutator are carried by a bracket 89 secured to retainer member 58 by means of screws 90, and the arms of bracket 89 have screws 91 for adjusting the pressure of the wipers 88 against the commutator bars.

The shaft 79 projects through bearing 25 and mounts at its end a gear 92 which meshes with a gear 93 on shaft 94 which is supported at one end by casing extension 26 and at the other end by a bracket 95 secured to extension 26 by screws 96. This shaft 94 also has a gear 97 which meshes with a gear 98, which is rotatably mounted on extension 99 of clutch member 100. The extension 99 is pivotally mounted in bracket 95 by means of bearings 101 and 102 so that the clutch member 100 can be rotated relative to the instrument casing. This clutch member has a groove for receiving electromagnet 103 and has a circular disc armature 104 which is rotatably mounted on shaft 105, supported by bearings 106 and 107 retained in casing 5. The shaft 105 carries stops 108 and 109 so as to permit the shaft to move longitudinally of these bearings a small distance. The clutch member 100 has a small central opening 110 containing a ball 111 and a coil spring 112, and this spring continually pushes the ball against disc 104 to break the coupling between electromagnet 103 and disc 104. However, it is apparent that when the electromagnet 103 is energized, the armature disc 104 will be drawn against the clutch member so that the clutch member and disc will move together. The shaft 105 carries a pulley wheel 113 driven by a follow-up cord 114 connected to one of the servos utilized to control the movement of the craft.

In a like manner the shaft 11 of motor 39 passes through bearing 12 and carries a gear 116 in mesh gear 117 carried by shaft 118. This shaft 118 also mounts a gear which drives gear 119 rotatably mounted on extension 120 of clutch member 121, and the extension 120 is also mounted for rotation by bearings 122 and 123 retained in bracket 124. The clutch member 121 has a circular groove for receiving electromagnet 125, and an armature 126 is mounted on a shaft 127 rotatably supported by bearings 128 and 129 secured in cover 6. The shaft 127 has stops 130 and 131 to allow a slight amount of longitudinal movement of shaft 127 relative to its bearings. The projection 120 has an opening 132 which holds a ball 133 and the spring 134 continually presses the ball against armature 126 to disengage the armature from the electromagnet 125. When the electromagnet 125 is energized, the armature 126 will be drawn against the clutch member 121 so that these two members will move together. The end of the shaft 127 carries a pulley wheel 135 which is moved by follow-up linkage 136.

In order for the gyroscope instrument of this invention to control the servos of the craft, potentiometer references are utilized about both the inner gimbal and outer gimbal axes. The casing 23 mounts a wiper arm 137 which is secured to the casing by an insulated bracket 138 retained by screws 139, and these screws also retain an arm 140 having a screw 141 to adjust the pressure of wiper 142 against winding 143. The winding 143 is carried in a groove in insulated member 144, which extends around the circumference of member 100 so that the winding 143 will be positioned by member 100. In a like manner, a wiper arm 145 is carried by an insulated bracket 146 secured to casing 10 by means of screws 147, and this bracket also supports an arm 148, which carries a screw 149 for adjusting the pressure of wiper 150 against winding 151. This winding 151 is supported in a groove in insulated member 152, which is mounted around the circumference of clutch member 121. It will therefore appear that wipers 142 and 150 will be positioned by the gyroscope and will cooperate with windings 143 and 151 to form potentiometers to control the direction of flight of the craft.

Since the clutch members 104 and 121 and the motor casings 10 and 23 are mounted for movement relative to the gyroscope casing, it is necessary to supply direct current to these parts by means of slip rings or some other suitable type of connection. The clutch member 100 carries an insulated member 153 which mounts four conducting rings 154, and wipers 155, 156, 157, 158 each of which bear against one of these rings are supported by a bracket 155a carried by bracket 95. The wipers 155 and 156 complete the circuit to electromagnet 103, while wipers 157 and 158 complete the circuit to winding 143. In a like manner, a circular insulated member 159 is carried by clutch member 121 and has four conducting rings 160, and the wipers 161, 162, 163, 164 each bear on one of these conducting rings. The wipers 161 and 162 complete the circuit for the electromagnet 125, while the wipers 163 and 164 complete the circuit for the winding 151. The connections for all the wipers lead directly to the electrical plug 40 in the casing.

In order to supply electrical current from the casing 1 to the motor 38 and wiper 142, three conducting bars 165 are supported by an insulated member 166 attached to casing 23. Three electrical contacts 167, 168, 169 are mounted on casing 1 by an insulated mounting 170, and each of the contacts continually bears against one of the conducting bars. In a similar manner, three conducting bars 171 are mounted by an insulated member 172 on casing 10 while three electrical contacts 173, 174, 175 are secured by bracket 176 to casing 1, and each one of these contacts continually bears against one of the conducting bars. The contact 167 on casing 23 connects with wiper arm 142 while the contacts 168 and 169 connect the armature of motor 38 with leads 53 and 54 of gravity switch 34, by which the armature is energized. The contact 175, carried by casing 10, connects with wiper 150 while the contacts 173 and 174 connect the armature of motor 39 with the leads 50 and 51 of gravity switch 30, by which the armature is energized. The leads for the connections for contacts 167 and 175 can pass directly to the electrical plug 40 in the casing 1.

The electrical wiring circuit which has been described above is illustrated in Figure 12, and the operation of the gyroscope instrument of this invention will be described in connection with this figure. When the motors 38 and 39 are utilized as erecting motors, they will be energized by switches 34 and 30, respectively, when the gyroscope moves away from true vertical. For instance, if the gyroscope moves away from true vertical about the inner gimbal ring in one direction or the other, either contacts 32 or 33 of switch 30 will be closed by globule 31, in which event either solenoid 177 or solenoid 178 will be energized. The switch arms 179 and 180 will be closed if solenoid 177 is energized in order to drive erection motor 39 in one direction, and switch arms 181 and 182 will be closed if solenoid 178 is energized in order to drive the erection motor 39 in the opposite direction. It is possible to have the erection motor exert reverse torquing forces since the polarity is reversed between switch arms 179 and 181 and between switch arms 180 and 182. Thus, the motor 39 will operate to place a torque on the outer gimbal, which will precess the gyroscope about the inner gimbal back to its true vertical position, at which time the globule 31 will again become centered between the pairs of contacts. In a like manner, the switch 34 can be utilized to maintain the gyroscope in true vertical position about the outer gimbal ring, and if the gyroscope deviates from true vertical, either contacts 36 or 37 will be closed by globule 35, thus causing either solenoid 183 or solenoid 184 to be energized. Switch arms 185 and 186 will be closed upon energization of solenoid 183 to cause motor 38 to exert a torque in one direction, while switch arms 187 and 188 will be closed upon energization of solenoid 184 to cause motor 38 to exert a torque in the opposite direction. It is possible to reverse motor 38 since the polarity between switch arms 185 and 187 and between switch arms 186 and 188 is reversed. Therefore, switch 34 will operate to cause motor 38 to exert an erecting torque upon the inner gimbal ring through bail 20 in a direction and in an amount to precess the gyroscope back to true vertical about the outer gimbal axis.

It is pointed out that during normal operation of the gyroscope, during which time the motors 38 and 39 are acting as erection motors, the electromagnet 103 is energized through switch arms 189 and 190, while the electromagnet 125 is continually energized through switch arms 191 and 192. Since this is the case, the armature discs 104 and 126 are continually held against clutch members 100 and 121, and the follow-up linkages 113 and 136 prevent rotation of the motor armatures of motors 38 and 39, respectively. Therefore, the torque produced by the motor armatures is exerted through the motor casings 10 and 23 to the gyroscope gimbals, while the armatures themselves are held stationary by the follow-ups. As long as the gyroscope remains in true vertical, the instrument casing and motor armatures can move relative to the pole pieces without exerting unwanted torques on the gyroscope since the armature is constructed of a wholly non-magnetic material which has no inherent residual magnetism.

In the event it is desired to maneuver the aircraft about the inner gimbal axis, the motor 38 can be utilized as a trim motor rather than as an erecting motor in order to move the winding 143 relative to wiper 142 and thus bias the inner gimbal reference potentiometer in either direction. If it is desired to maneuver the aircraft in one direction, the switch 193 can be closed, either manually or by a radio signal, to energize solenoid 194, which in turn will close switch arms 195 and 196 and open switch arm 190. Thus, the electromagnet 103 will be de-energized and the armature for motor 38 will no longer be held by followup 113. The armature of motor 38 will be free to move relative to the pole pieces and drive winding 143 in the desired direction through the gearing comprised of gears 92, 93, 97 and 98. If it is desired to move the winding 143 in the reverse to bias the inner gimbal potentiometer, the switch 197 can be closed in a similar manner to energize solenoid 198, which in turn will close switches 199 and 200 and open switch arm 189. The electromagnet 103 will again be de-energized to release the motor armature from the follow-up and the armature of the motor 38 will move to bias the potentiometer in the opposite direction. The motor 38 can be reversed because the switch arms 195 and 199 and arms 196 and 200 have their polarity reversed.

In the event that it is desired to maneuver the gyroscope about the outer gimbal axis in one direction, the switch arm 201 can be closed either manually or by a radio signal to energize solenoid 202, which in turn will close switch arms 203 and 204 and open switch arm 191. This will de-energize electromagnet 125 and free the armature of motor 39 from the follow-up 136, and the armature of the motor 39 can then move the winding 151 through gearing comprised of gears 116, 117, 119. If it is desired to maneuver the gyroscope in the opposite direction about the outer gimbal axis, the manual switch 205 can be closed in a similar manner to energize solenoid 206, which will close switch arms 207 and 208 and open switch arm 192 to again de-energize electromagnet 125 and free the motor armature from the follow-up 136. Thus, the winding 143 can be driven in opposite direction to bias the pickoff, and this reversing of directions of the motor 39 is accomplished since switch arms 203 and 207 and switch arms 204 and 208 have opposite polarity.

It is thus apparent that by the present invention a gyroscope instrument is provided which is equipped with direct-current motors to serve the purpose of erecting the gyroscope to true vertical and also to serve as trim motors to bias the reference potentiometers and thereby maneuver the craft. Each of these motors is so constructed that its armature has no inherent residual magnetism, and therefore no unwanted torques will be placed upon the gyrovertical while the motor is acting as a torquing motor and when the armature moves with the craft relative to the field developed in the pole pieces. The motor armature winding is practically self-supporting and is further supported by impregnating the winding with some suitable non-magnetic material. Therefore, the motor armature has a minimum of mass and is mounted on very small bearings to reduce armature friction. Because of these factors, the armature has a high torque-to-inertia ratio so that when it is energized to move the winding of the accompanying potentiometer, there will be a minimum of overshooting of the motor and hunting will be avoided upon automatic centering of the trim motor. By utilizing a single motor both as a torquing motor and as a trim motor, a substantial saving in the cost of control instruments can be realized as is readily apparent. Further, since this motor operates on direct current, it is unnecessary to utilize a converter or other means to obtain an alternating current supply for the moving craft.

While the armatures for the D. C. motors are described as connected to the servo follow-ups, it is understood that the armature could be connected directly to the gyro gimbals and the pole pieces and core, in turn, secured to the servo follow-up. Also, the gyroscope instrument can be placed in any desired position in the craft so as to control the movement of the craft about selected axes. The gyroscope instrument of this invention can be utilized with servos which do not require follow-ups by simply securing the armature disks of the clutch mechanisms to the casing of the instrument in a manner to prevent rotation of the motor armatures when the clutching mechanisms are energized. Such a servo, which requires no follow-up, is disclosed in United States Patent No. 2,635,836, granted April 21, 1953, to Thomas O. Summers, Jr. It is further understood that the neutrally balanced bail utilized for connecting one of the motors with the gyroscope could be replaced by any other suitable connection and that the wiring circuit represents only one of a number of suitable circuits. Various other modifications may obviously be resorted to by those skilled in the art without departing from the spirit and scope of the invention as set forth in the appended claims.

What is claimed is:

1. A gyroscope instrument for a movable craft comprising a universally supported gyroscope, direct current means positioned about two axes of said gyroscope, said direct current means being connected to said gyroscope to apply erecting torques thereto, gravity sensitive means energized upon movement of said gyroscope away from true vertical to energize said direct current means to precess said gyroscope back to true vertical, means positioned about the same two axes for controlling the direction of movement of the craft and means independent of said gravity sensitive means to energize said direct current means to adjust said direction controlling means.

2. A gyroscope instrument for a movable craft comprising a universally supported gyroscope, gravity sensitive means energized in response to the movement of said gyroscope away from true vertical, control means responsive to the position of said gyroscope for controlling the direction of said craft and power means operative in response to said gravity sensitive means to precess said gyroscope to true vertical and operative in response to a control signal to bias said control means and thereby change the direction of said craft.

3. A gyroscope instrument for a movable craft comprising a gyro rotor supported by inner and outer gimbals, a first direct current torquing motor positioned about the outer gimbal axis and a second direct current torquing motor positioned about the inner gimbal axis, each of said direct current motors including a pole piece and core attached to said gyroscope and an armature mounted for movement relative thereto, gravity sensitive switch means connected to said armatures and positioned to be energized by movements of said gyro rotor away from true vertical about the inner and outer gimbal axes, direction control means connected to each of said armatures to be moved thereby and clutch means for holding the said armatures when said gravity sensitive switch means are operative to energize said armatures and for releasing said armatures when energy is supplied thereto for adjusting said control means.

4. A gyroscope instrument for a movable craft comprising a gyro rotor supported by inner and outer gimbals, a power means having a first portion connected to one of said gimbals and a second portion movable relative to said first portion, gravity sensitive means responsive to the position of said gyroscope to energize said power means in order to continually precess said gyroscope to true vertical, control means connected to one of said portions for movement therewith and means for energizing said power means to change the course of said aircraft by moving said control means.

5. A gyroscope instrument as defined in claim 4 wherein said control means is connected to said second portion by a clutch means interposed between said second portion and said control means, said clutch means being energized to prevent movement of said second portion while said power means is energized by said gravity sensitive means and being de-energized to free said second portion for movement of said control means.

6. A gyroscope instrument as defined in claim 5 wherein said control means is comprised of a potentiometer having one element connected to said second portion and another element connected to said one gimbal.

7. In an instrument for controlling a movable craft, a universally mounted gyroscope, gravity sensitive means energized upon movement of said gyroscope away from true vertical about one of its axes, power means having relatively movable elements with a first element being connected to said gyroscope and the second element connected to a clutching means to selectively prevent its movement relative to said first element, said second element being energized by said gravity sensitive means to precess said gyroscope to true vertical about said one axis while said clutching means is operative to hold said second element, control means connected to said second element for adjustment thereby and means for energizing said second element while said clutching means is ineffective to hold said second element in order to adjust said control means by movement of said second element relative to said first element.

8. A gyroscope instrument for a movable craft comprising a gyroscope supported by at least one gimbal, a gravity sensitive means carried by said gyroscope and energized upon movement of said gyroscope away from true vertical, power means having relatively movable elements one of which is supported by said gimbal and the other connected to clutch means to selectively brake its movement, control means connected to said other element for movement thereby to adjust the direction of movement of said craft, said power means being energized by said gravity sensitive means while said other element is held by said clutch means in order to precess said gyroscope to true vertical, and means for energizing said other element independently of said gravity sensitive means while said clutch means is ineffective to brake said other element so that said control means will be moved by said other element.

9. A gyroscope instrument for a movable craft comprising a gyro rotor having a spin axis and mounted by inner and outer gimbals, pickoff means mounted about the inner and outer gimbal axes to control the movement of said craft, a first gravity switch mounted to be energized upon deviations of said gyro rotor spin axis from true vertical about the inner gimbal axis, a second gravity switch means mounted to be energized by deviations of said gyro spin axis from true vertical about the outer gimbal axis, first and second direct current motors responsive to the energization of said first and second gravity switches respectively to apply torques to said gimbals in a direction to maintain the gyro rotor spin axis in true vertical, and means independent of said gravity switches to energize said first motor to bias said pickoff means about the outer gimbal axis and means independent of said gravity switches to energize said second motor in order to bias said pickoff means about the inner gimbal axis.

10. In an instrument for controlling the movement of a movable craft, a universally mounted gyroscope, a pickoff mounted about one of the axes of said gyroscope, a gravity sensitive switch energized by movement of said gyroscope away from true vertical about another of said axes, a direct-current motor having pole pieces supported by said gyroscope and an armature mounted for movement relative to said pole piece, clutch means for selectively braking the movement of said armature, said armature being energized by said gravity sensitive switch while said clutch means is operative to hold said armature in order to torque the gyroscope to true vertical about said other axis, means for connecting said armature to said pickoff and means independent of said gravity switch to energize said armature while said clutch means is inoperative to hold said armature in order to bias said pickoff.

11. In a controlling instrument as defined in claim 10 wherein said armature is composed of non-magnetic winding impregnated with a non-magnetic material to make the winding self-supporting.

12. A gyroscopic instrument for a movable craft comprising a universally mounted gyroscope, power means for applying erecting torques about one axis of said gyroscope, control means associated with said one axis for controlling the attitude of said craft about said axis and means selectively operable to bias said control means with said power means to change the attitude of said craft about said axis.

13. A gyroscopic instrument as defined in claim 12 wherein said power means comprises a direct current motor having an armature wholly composed of non-magnetic material so that movement of said armature while de-energized relative to said gyroscope will not produce undesirable torques on said gyroscope.

14. A gyroscopic instrument for a movable craft comprising a universally supported gyroscope, power means connected to said gyroscope for applying erecting torques about one axis of said gyroscope upon movement of said gyroscope away from its reference position about another axis, control means associated with said one axis for controlling the attitude of said one craft about said axis, said control means also being connected to said power means, and means for selectively utilizing said power means for torquing said gyroscope or for biasing said control means.

15. A gyroscopic instrument for a movable craft comprising a universally supported gyroscope, power means having two relatively movable components, one of said components being connected to one axis of said gyroscope, control means for controlling movement of said craft about said one axis, said control means being connected to the other of said components, means for normally holding said other component so that said power means operates to torque said gyroscope and means for releasing said holding means so that said power means operates to bias said control means.

16. A gyroscopic instrument as defined in claim 15 wherein said power means comprises a direct current motor, and one of said components comprises an armature wholly constructed of non-magnetic material so that said armature has no inherent residual magnetism to cause undesirable torquing of said gyroscope.

17. A gyroscopic instrument for a movable craft comprising a universally supported gyroscope, means energized in response to the movement of said gyroscope away from its reference position, control means responsive to the position of said gyroscope for controlling the direction of said craft and power means operative in response to said energized means to precess said gyroscope to its reference position and operative in response to a control signal to bias said control means and thereby change the direction of said craft.

References Cited in the file of this patent

UNITED STATES PATENTS

| | | |
|---|---|---|
| 1,923,290 | Wood | Aug. 22, 1933 |
| 2,270,875 | Hanson | Jan. 27, 1942 |
| 2,571,260 | Kutzler | Oct. 16, 1951 |
| 2,608,868 | Buhl | Sept. 2, 1952 |